March 19, 1929. O. F. CHICHESTER ET AL 1,705,808
SLAT TRIMMING MACHINE
Filed June 25, 1927   2 Sheets-Sheet 1
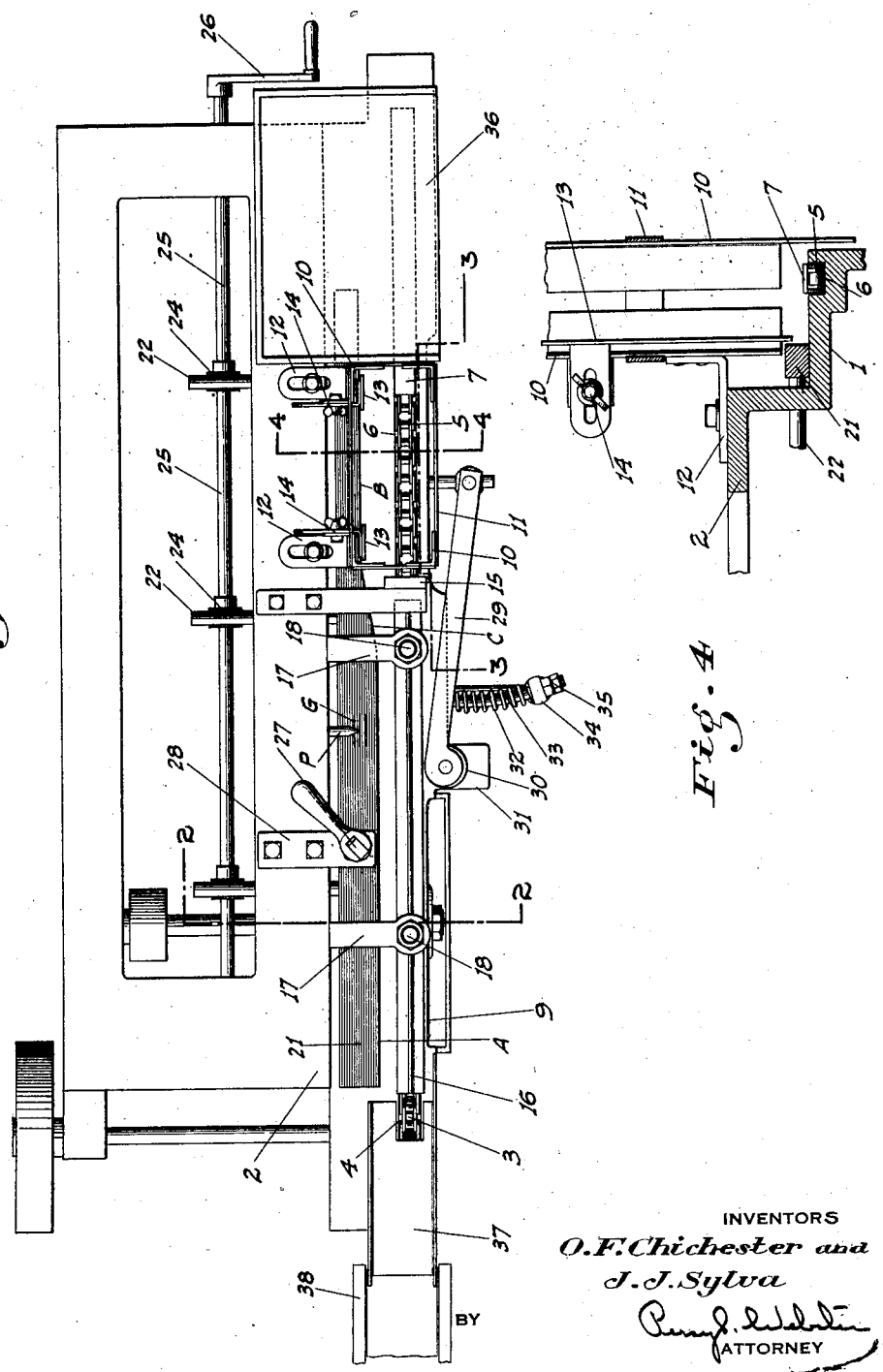
INVENTORS
O. F. Chichester and
J. J. Sylva
BY
ATTORNEY March 19, 1929.  O. F. CHICHESTER ET AL  1,705,808
SLAT TRIMMING MACHINE
Filed June 25, 1927   2 Sheets-Sheet 2
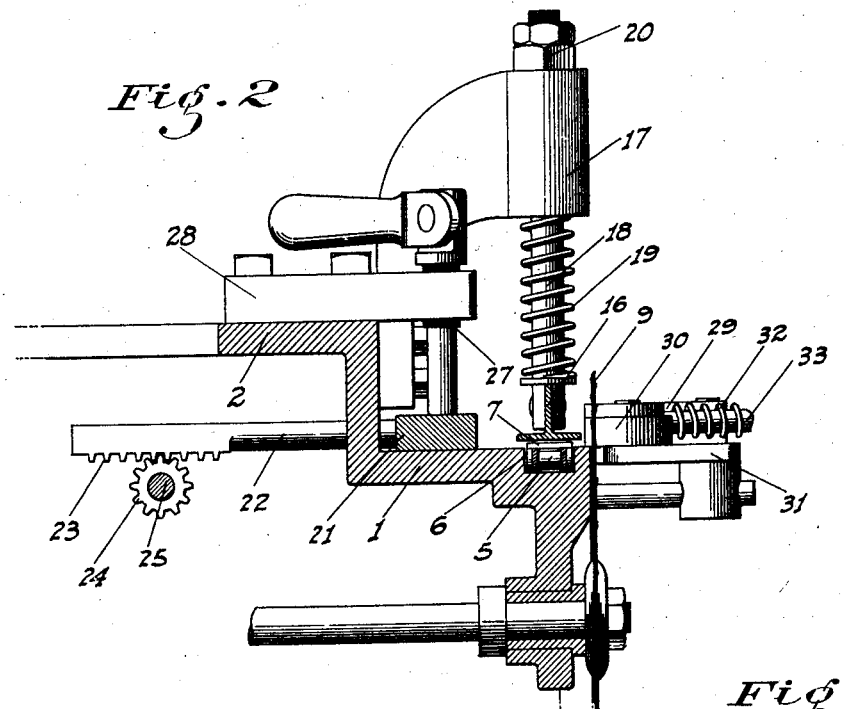
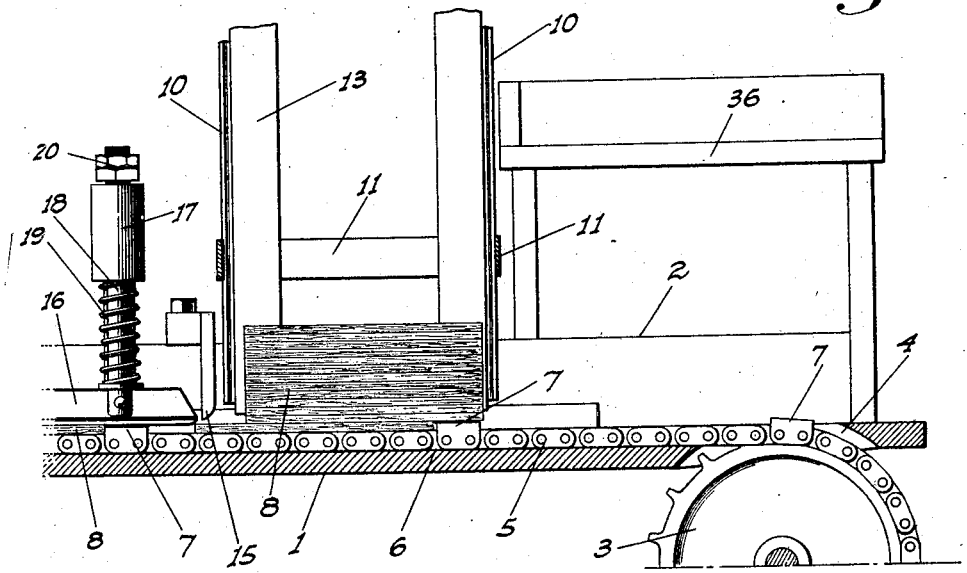
INVENTORS
O. F. Chichester and
J. J. Sylva
BY
ATTORNEY Patented Mar. 19, 1929.

1,705,808

UNITED STATES PATENT OFFICE.

OSCAR F. CHICHESTER AND JOHN J. SYLVA, OF STOCKTON, CALIFORNIA, ASSIGNORS TO CALIFORNIA CEDAR PRODUCTS COMPANY, OF STOCKTON, CALIFORNIA, A CORPORATION.

SLAT-TRIMMING MACHINE.

Application filed June 25, 1927. Serial No. 201,458.

This invention relates to wood cutting machinery and particularly to a machine for edging or trimming pencil-stock slats along one side edge. In a machine for this purpose it is absolutely essential that all the slats shall be the same width when finished. It is also necessary that the machine shall handle a considerable number of slats per minute in order to attain the desired quantity production without necessitating the use of a number of machines in any one plant.

Essentially such a machine comprises a circular saw, a hopper for the untrimmed slats and a chain or similar conveyor to move the slats successively from the hopper past the saw in very rapid order. The slats bear along one side against a rigid guide and along the other side against a yieldable guide, since the width of the slats before being acted on by the saw is apt to vary considerably. Heretofore the arrangement of parts in the machine ordinarily used has been such that except at low speeds the slats as being fed from the hopper toward the saw had an apparently uncontrollable tendency to bear heavily against the yieldable guide, so that the latter wore out, the slats were not always properly alined with the saw and would sometimes be cut with a taper, and excessive friction in operation developed.

The speed at which the operation of the machine had to be kept in order to cause said machine to do good work was so low as to render the same practically valueless for successful commercial use.

The principal object of our invention therefore is to eliminate the above defective features by constructing the machine in such a manner that the excessive pressure of the slats against the yieldable guide member is overcome and said slats bear instead evenly and firmly against the rigid guide member as they should.

The improved features of construction which we have incorporated in the machine and as hereinafter described, are such that the machine can be operated at practically any speed (the feeding of 1,000 slats per minute being possible) with the assurance that the slats will be turned out in an accurately finished condition.

As a result the machine operates more smoothly, there is less friction to overcome and wear is reduced to a minimum.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claims.

In the drawings similar characters of reference indicate corresponding parts in the several views:

Fig. 1 is a top plan view of the complete apparatus.

Fig. 2 is an enlarged cross section on the line 2—2 of Fig. 1.

Fig. 3 is a fragmentary cross section on the line 3—3 of Fig. 1.

Fig. 4 is a fragmentary longitudinal section on the line 4—4 of Fig. 1.

Referring now more particularly to the characters of reference on the drawings, the numeral 1 denotes a horizontal table of suitable dimensions disposed at one side of and below the upper surface of a supporting structure 2. Turnably mounted in connection with and under the table adjacent the opposite ends thereof are driven sprocket wheels 3, projecting somewhat into slots 4 cut through the table. An endless chain 5 passes about the sprockets, the upper run of this chain riding in a longitudinal groove 6 cut in the table between the slots 4, the depth of the groove being such that the top of the chain is slightly below the top of the table. Certain links of the chain are formed with upstanding lugs 7 which project above the surface of the table a distance slightly less than the thickness of the slats 8 to be handled.

Disposed adjacent the outer edge of the table, parallel to the slot and chain and intermediate the sprockets but near one of the same is a vertically disposed circular saw 9 which projects above the table a certain distance.

Disposed over the table and chain toward the other sprocket is a vertical hopper to carry a number of slats in flat superimposed order. This hopper comprises four angle corner members 10, connected to form a rigid structure by horizontal straps 11. The hopper is supported from the structure 2 by brackets 12 which are adjustable transversely of the table and chain. Vertical strips 13 are disposed inwardly of the innermost pair of members 10, said strips being supported from said members for transverse adjustment by adjustable bracket structures 14. The space between the longitudinally disposed corner members 10 is such that the slats (which are always the same length) will fit freely therebetween and will extend lengthwise of the chain; while the strips 13 are spaced from the outer corner members so that the width of the uncut slats (which vary) will also fit freely therebetween. The bottom of the hopper members terminates above the table a sufficient distance to permit the chain lugs to pass freely thereunder. The outer faces of the outer members 10 however depend below the outer edge of the table as shown in Fig. 4 so as to prevent the possibility of any of the slats being discharged from the hopper laterally. The hopper is disposed so that its longitudinal center of width is not centrally alined with the chain but is offset inwardly of the same or on the side thereof away from the outer edge of the table and saw.

Beyond the hopper in the direction of the saw a fixed vertical stop bar 15 depends over the chain, terminating thereabove a sufficient distance to permit only one slat passing thereunder at a time.

Disposed above the chain and extending from the bar 15 to a point beyond the saw is a horizontal presser bar 16. Brackets 17 are mounted on the structure 2 at longitudinally spaced intervals, said brackets overhanging the bars 16 and slidably receiving rods 18 which are secured to said bar. Springs 19 on the rods between the brackets and the bar tend to force the latter down, while adjustable nuts 20 on the rods above the brackets restrict the downward movement. These nuts are set so that the bar will be normally disposed above the table a distance slightly less than the thickness of the slats, so that when the latter pass under the bar the bar will be raised slightly and will maintain a frictional pressure against the slats, as will be evident.

Resting on the table 1 and extending from beyond the saw to a point somewhat beyond the hopper is a rigid guide bar 21. This bar is adjustable transversely by laterally extending rods 22 connected thereto and extending away from the saw and the outer edge of the table. The outer free ends of the rods have rack teeth 23 thereon engaged by pinions 24. These pinions are mounted on a common shaft 25 which at one end is provided with a turning handle 26.

To aid in setting the bar to the proper positions for different widths of slat said bar is provided with transversely spaced gage marks G cooperating with a fixed pointer P projecting laterally from the structure 2. The bar is pressed against the table when once set by a hand operated clamping screw 70 27 mounted over the bar in a bracket 28 supported from the structure 2. The outer edge A of the bar from the saw to a point some distance in front of the hopper is straight and parallel to the chain and saw, the bar being set so that the distance from this edge to the saw will be equal to the width desired for the trimmed and finished slat. The outer edge B of the bar under the hopper is also straight but the distance from said edge to the chain is greater than that from the edge A to the chain, the hopper being preferably set so that said edge B is back of the slat engaging faces of the strips 13. The edge B terminates adjacent the discharge end of the hopper and is connected to the edge A by a straight sloping edge C.

This is a very important feature. While the strips 13 are set so as to accommodate slats of different widths in the hopper such setting cannot be very close, since the initial width of slats of the same nominal size varies considerably. Therefore if the edge of the fixed guide continued in longitudinal alinement with the edge A throughout, the space to accommodate the slats when in the hopper and resting on the table would be cramped. The guides in previous machines however have always been made in this manner, which resulted in the slats tending to project outwardly an undue distance which caused the slats to initially bear with excessive pressure against the yieldable guide bar on the opposite side.

Extending lengthwise of the table above the same from adjacent the center of length of the hopper to a point a short distance in front of the saw is the yieldable guide bar 29. The end of the bar nearest the hopper is pivoted onto the supporting structure of the machine and is disposed outwardly of the table a certain distance, sloping thence at an acute angle toward its opposite end, at which end a roller 30 is mounted so as to be flush with the inner edge of the bar. Said roller is disposed just a short distance ahead of the saw and rests on a pad 31 which projects outwardly from the table flush therewith. The bar is pressed inwardly at its roller end, so that said end is slightly inwardly of the longitudinal plane of the saw by means of a spring 32 mounted on a rod 33 which projects laterally and outwardly from the bar intermediate its ends and slidably passes through a fixed guide block 34 supported from the table. The action of the spring is limited so as to limit the movement of the roller across the table by adjustable nuts 35 mounted on the rod outwardly of the block.

In operation the hopper is kept filled with slats properly arranged from a supply kept on a table 36 which is mounted in connection with the machine adjacent the hopper. With the movement of the upper run of the chain toward the saw the chain lugs successively engage the ends of the lowermost slats and push them out of the hopper toward the saw. As soon as one slat is clear of the hopper the slat above will immediately drop down to take its place to be engaged by the following lug, as will be evident. The lugs engaging the slats outwardly of the longitudinal central plane thereof overcome any tendency of said slats to creep out and tend to force them inwardly toward the fixed guide. The necessary amount of room for this shifting of the slats is had by reason of the cut-back edge B of the guide as previously explained. The forward inner corners of the slats then coming in contact with the slope edge C of the fixed guide, said slats are shifted transversely and outwardly until they are properly guided by the straight edge A. The slats are prevented from any further tendency to shift outwardly by the presser bar 16 with which the slats then engage. The slats therefore move evenly toward the saw, only engaging the yieldable guide member when adjacent the saw, and minimizing the movement and wear on said guide.

After passing through the saw, which of course cuts strips off the outer edges of the slats whose width depends on the distance from the edge A to the saw relative to the initial width of the slats, the latter pass onto a chute 37 which delivers onto a conveyor 38 of suitable character.

The chain being below the level of the table causes the slats to be supported by the latter, so that when said slats are engaged by the presser bar the chain will not be pressed against the slat nor will it be pressed into engagement with the bottom of the groove, which would of course cause undue friction of movement of the chain. The chain conveyor extending past the saw, the slats are maintained in positive driving engagement with the saw until they have been entirely cut through. The presser bar also maintaining its frictional engagement with the slats while they are passing through the saw prevents any tendency of said slats to be shifted while they are being cut.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention what we claim as new and useful and desire to secure by Letters Patent is:

1. A slat trimming machine including a table, a saw mounted in connection therewith and projecting thereabove, a hopper to hold a supply of slats in superimposed order mounted in longitudinally spaced relation to the saw, a rigid guide bar disposed on the table and extending from the saw to one side thereof to and under the hopper; the edge of the bar adjacent and facing the saw being parallel thereto and a predetermined distance therefrom, and the corresponding edge of the bar under the hopper being a greater distance from the longitudinal plane of the saw than said first named edge portion, the guide member being provided with a longitudinally inclined edge portion connecting the adjacent ends of said relatively offset edge portions, and means for moving slats successively from the hopper towards the saw and for also tending to cause said slats to shift laterally toward the adjacent edge of the guide bar.

2. A slat trimming machine including a table, a vertical saw associated therewith, a slat hopper above the table beyond the saw, a rigid continuous guide member disposed to one side of the saw and extending to and under the hopper; the edge of the guide adjacent and facing the saw being parallel thereto and the corresponding edge of the guide under the hopper being a greater distance from the longitudinal plane of the saw than said first named edge portion, the guide member being provided with a longitudinally inclined edge portion connecting the adjacent ends of said relatively offset edge portions, and means movable lengthwise of the table and parallel to the saw for engaging one end of the lowermost slat in the hopper and moving the slat out of the hopper and toward the saw.

3. A structure as in claim 2, in which a vertical slat-guiding element is provided in connection with the hopper, said element at its lower end terminating above the table a distance greater than the thickness of a slat and being disposed nearer the longitudinal plane of the saw than the adjacent edge portion of the guide, whereby to provide space for the lowermost slat to shift laterally and toward the guide when engaged by the slat moving means.

In testimony whereof we affix our signatures.

OSCAR F. CHICHESTER.
JOHN J. SYLVA.